United States Patent
Rothberg

(10) Patent No.: US 6,317,850 B1
(45) Date of Patent: Nov. 13, 2001

(54) ERROR RATE MEASUREMENT IN DISK DRIVE BY WEIGHTING DATA-RECOVERY PROCEDURES

(75) Inventor: Michael S. Rothberg, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/484,059

(22) Filed: Jan. 18, 2000

(51) Int. Cl.$^7$ .................................................. G06F 11/00
(52) U.S. Cl. .................................................. 714/704
(58) Field of Search .................................. 714/704, 718, 714/746, 770

(56) References Cited

U.S. PATENT DOCUMENTS 5,889,784 * 3/1999 Rogers .................................. 714/704

* cited by examiner

Primary Examiner—Phung M. Chung

(74) Attorney, Agent, or Firm—Milad G Shara

(57) ABSTRACT

A disk drive is disclosed comprising a disk including a plurality of addressable locations containing stored data, and signal processing circuitry comprising reading means responsive to the stored data for producing a read signal, and means responsive to the read signal for producing decoded data that is subject to errors. A control system, responsive to the decoded data, computes an error rate measurement by performing a first data-recovery procedure conducted under conditions providing for increasing the probability of achieving a first successful data-recovery step, and by performing a second data-recovery procedure conducted under conditions providing for increasing the probability of achieving a second successful data-recovery step. The control system accumulates a first accumulated value representing occurrences of the first successful data recovery step and accumulates a second accumulated value representing occurrences of the second successful data recovery step. The control system weights the first accumulated value by a first weight to generate a first weighted value, and weights the second accumulated value by a second weight different than the first weight to generate a second weighted value. The control system computes the error rate measurement by combining the first and second accumulated values and the first and second weighted values.

18 Claims, 4 Drawing Sheets

ERROR RATE MEASUREMENT IN DISK DRIVE BY WEIGHTING DATA-RECOVERY PROCEDURES

CROSS REFERENCE TO RELATED APPLICATIONS AND PATENTS

This application is related to copending U.S. patent application Ser. No. 09/138,805 entitled "DISK DRIVE HAVING DATA-GUARDING FIRMWARE" the disclosure of which is herein incorporated by reference.

BACKGROUND OF THE INVENTION

1. Field of the Invention

The present invention relates to disk drives. More particularly, the present invention relates to computing an error rate measurement in a disk drive by weighting data-recovery procedures.

2, Description of the Prior Art

The error rate of a disk drive provides useful information about the drive's performance, for example, how to improve performance by calibrating the drive or how likely the drive will fail in the future. A conventional method for estimating the error rate is to divide the number of addressable locations with errors by the total number of addressable locations:

Error Rate=Addressable locations With Errors/Total Addressable locations. An addressable location is deemed to have errors if it cannot be successfully recovered using conventional sequence detection and error correction code (ECC) techniques during a read operation. There are several reasons an addressable location may not be successfully recovered during a read operation. For example, the addressable location may have an error associated with the media (e.g., media defects, high-fly writes, off-track writes, etc.) or the signal processing circuitry (e.g., the head, preamp, gain control, equalizers, etc.).

The conventional method of estimating the error rate using the above equation may not be reliable for certain applications such as calibrating the drive or predicting drive failure. For example, the conventional method of estimating the error rate does not differentiate between errors associated with the media and errors associated with the signal processing circuitry. Therefore, it may not be reliable to calibrate components in the signal processing circuitry using the conventional method of estimating the error rate. Similarly, the conventional method of estimating the error rate may not be reliable for predicting drive failure because the errors associated with the media and the errors associated with signal processing circuitry typically influence the error rate in different ways. For example, the media may degrade slower than the signal processing circuitry which can lead to errors in predicting drive failure. Further, particular signal processing components may degrade faster than others which is not taken into account in the conventional method of estimating the error rate.

There is, therefore, a need to generate a more reliable error rate measurement in a disk drive for use in applications such as drive calibration or drive failure prediction.

SUMMARY OF THE INVENTION

The present invention may be regarded as a disk drive comprising a disk including a plurality of addressable locations containing stored data, and signal processing circuitry comprising reading means responsive to the stored data for producing a read signal, and means responsive to the read signal for producing decoded data that is subject to errors. A control system, responsive to the decoded data, computes an error rate measurement by performing a first data-recovery procedure conducted under conditions providing for increasing the probability of achieving a first successful data-recovery step, and by performing a second data-recovery procedure conducted under conditions providing for increasing the probability of achieving a second successful data-recovery step. The control system accumulates a first accumulated value representing occurrences of the first successful data recovery step and accumulates a second accumulated value representing occurrences of the second successful data recovery step. The control system weights the first accumulated value by a first weight to generate a first weighted value, and weights the second accumulated value by a second weight different than the first weight to generate a second weighted value. The control system computes the error rate measurement by combining the first and second accumulated values and the first and second weighted values.

The present invention may also be regarded as a method of computing an error rate measurement in a disk drive comprising a disk including a plurality of addressable locations containing stored data and signal processing circuitry comprising reading means responsive to the stored data for producing a read signal and means responsive to the read signal for producing decoded data that is subject to errors. A first data-recovery procedure is performed on the decoded data conducted under conditions providing for increasing the probability of achieving a first successful data recovery step, and a second data-recovery procedure is performed on the decoded data conducted under conditions providing for increasing the probability of achieving a second successful data recovery step. A first accumulated value is generated representing occurrences of the first successful data recovery step, and a second accumulated value is generated representing occurrences of the second successful data recovery step. The first accumulated value is weighted by a first weight to generate a first weighted value, and the second accumulated value is weighted by a second weight different than the first weight to generate a second weighted value. An error rate measurement is computed by combining the first and second accumulated values and the first and second weighted values.

DESCRIPTION OF THE PREFERRED EMBODIMENTS

System Overview

Figure 1:
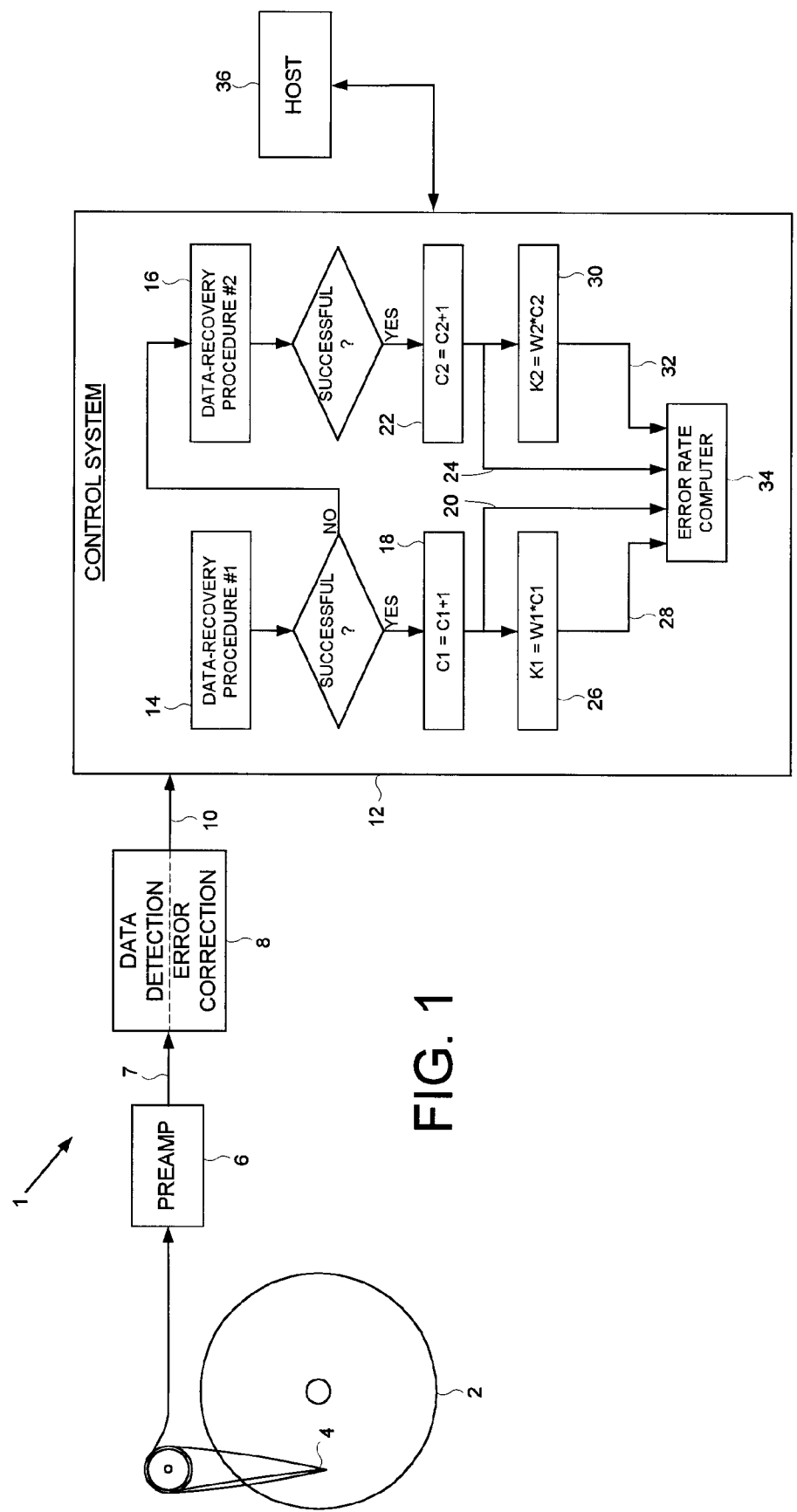
FIG. 1 shows a disk drive according to one embodiment of the present invention comprising a control system for executing data-recovery procedures, wherein the number of successful attempts by a data-recovery procedure is accumulated and weighted, and the accumulated and weighted values are used to compute an error rate.

FIG. 1 shows a disk drive 1 according to an embodiment of the present invention. The disk drive 1 comprises a disk 2 including a plurality of addressable locations containing stored data, and signal processing circuitry comprising reading means, such as a head 4 and preamp 6, responsive to the stored data for producing a read signal 7. A means, such as data detection and error correction circuitry 8, is responsive to the read signal 7 for producing decoded data 10 that is subject to errors. A control system 12, responsive to the decoded data 10, computes an error rate measurement by performing a first data-recovery procedure 14 conducted under conditions providing for increasing the probability of achieving a first successful data-recovery step, and by performing a second data-recovery procedure 16 conducted under conditions providing for increasing the probability of achieving a second successful data-recovery step. The control system 12 accumulates (e.g., using accumulator 18) a first accumulated value 20 representing occurrences of the first successful data recovery step and accumulates (e.g., using accumulator 22) a second accumulated value 24 representing occurrences of the second successful data recovery step. The control system 12 weights (e.g., using scaler 26) the first accumulated value 20 by a first weight W1 to generate a first weighted value 28, and weights (e.g., using scaler 30) the second accumulated value 24 by a second weight W2 different than the first weight W1 to generate a second weighted value 32. The control system 12 computes (e.g., using error rate computer 34) the error rate measurement by combining the first and second accumulated values 20 and 24 and the first and second weighted values 28 and 32.

The control system 12 comprises suitable circuitry, such as a microprocessor executing the steps of a program, or control logic executing a state machine. The data detection circuitry in one embodiment is a read channel comprising a suitable sequence detector, such as a partial response maximum likelihood (PRML) sequence detector, and the error correction circuitry in one embodiment implements a Reed-Solomon error correction code (ECC). The data detection and error correction circuitry 8 are used during an initial read operation to recover an addressable location from the disk 2. If the addressable location is successfully recovered, then the data stored in the addressable location is transferred to a host 36; otherwise, the control system 12 executes data-recovery procedures 14 and 16 in an attempt to recover the addressable location by modifying certain parameters of the disk drive 1 and performing a retry operation (rereading the addressable location). Modifying a parameter of the disk drive may increase the probability of achieving a successful data-recovery step.

Referring to FIG. 1, the control system 12 executes a first data-recovery procedure 14 which modifies a parameter and performs a retry. Example parameters that may be modified include a low pass filter frequency cutoff setting, a detection threshold setting, a jog off-track setting, a head bias setting, etc. If the addressable location is successfully recovered, then accumulator 18 increments a corresponding counter C1 to reflect that the first data-recovery procedure was successful. If the addressable location is not successfully recovered after executing the first data-recovery procedure 14, the control system 12 executes a second data-recovery procedure 16 which modifies a different parameter in the disk drive 1 and performs another retry. If the addressable location is successfully recovered, then accumulator 22 increments a corresponding counter C2 to reflect that the second data-recovery procedure was successful. After a predetermined number of addressable locations have been read, scalers 26 and 30 multiply the accumulated values 20 and 24 by respective weights W1 and W2 to generate weighted values 28 and 32. An error rate is then computed by error rate computer 34 which combines the accumulated values 20 and 24 and the weighted values 28 and 32.

In an alternative embodiment, the scalers 26 and 30 are integrated into accumulators 18 and 22 such that a fraction is added to the count values C1 and C2 rather than weighting the accumulated values 20 and 24. This implementation is an obvious variation of the mathematics employed to weight the data-recovery procedures. Other obvious variations of the mathematics are conceivable without departing from the intended scope of the present invention.

The data-recovery procedures 14 and 16 are correlated with particular types of errors in the disk drive 1. Thus, when a particular data-recovery procedure is successful in recovering an addressable location, the type of error that necessitated the data-recovery procedure can be inferred. For example, if the data-recovery procedure jogs the head so that reading occurs off-track, it can be inferred that the error associated with the addressable location was an off-track write error. Depending on the application, the weights W1 and W2 are selected to bias the error rate measurement relative to the particular type of error that occurred. For example, when drive failure prediction is based on evaluating the signal processing circuitry, the data-recovery procedures that correlate highly with media errors are assigned a low weight value (e.g., 0) to attenuate, or even exclude, their contribution to the error rate measurement. Conversely, when drive failure prediction is based on evaluating the media, the data-recovery procedures that correlate highly with errors in the signal processing circuitry are assigned a low weight value (e.g., 0).

Figure 2:
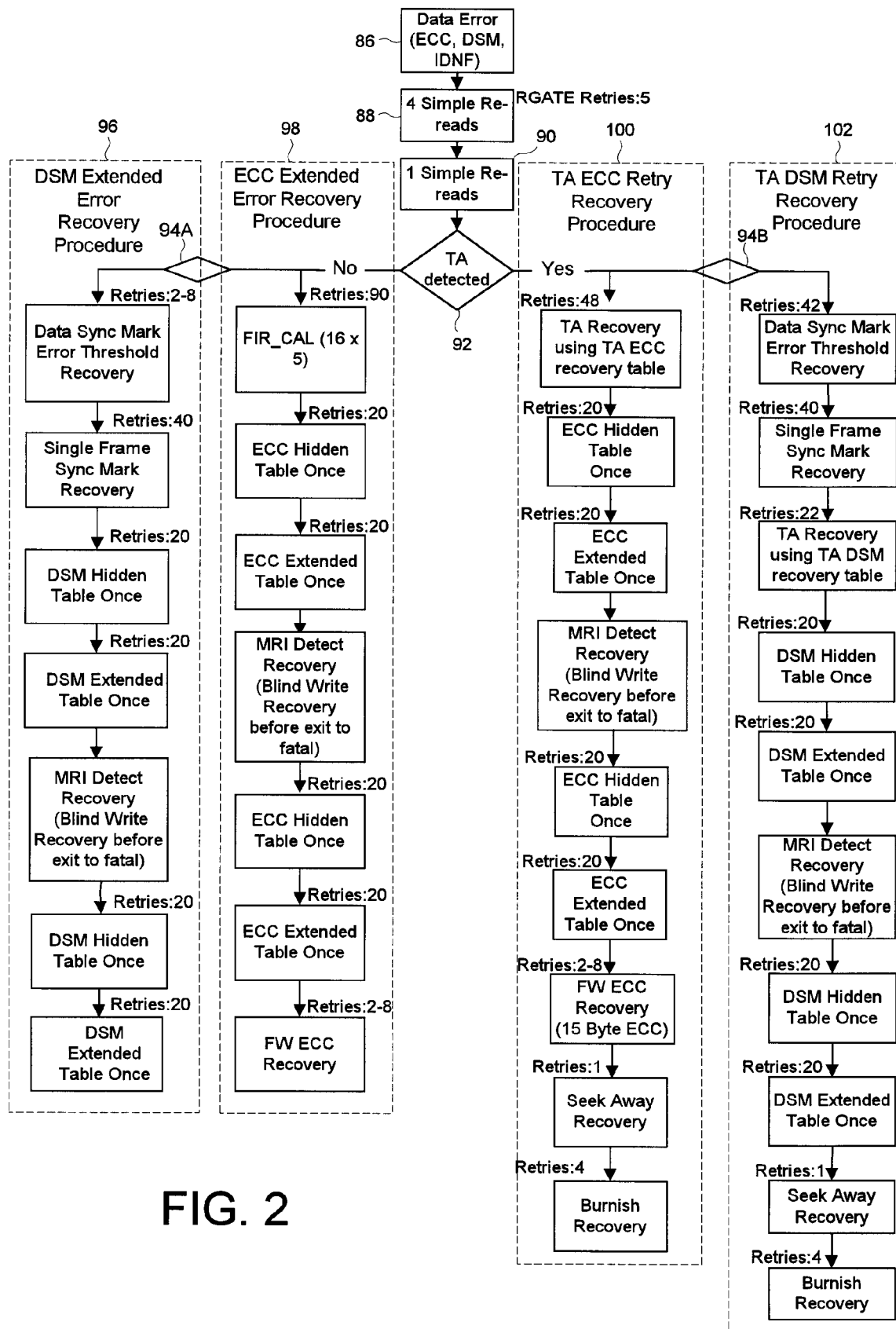
FIG. 2 is a flow diagram illustrating a number of data-recovery procedures which modify different parameters in the disk drive and then perform retries.

Examples for a number of data-recovery procedures which modify different parameters in the disk drive 1 and then perform retries are illustrated in the flow diagram of FIG. 2 which has been incorporated from the above-referenced patent application entitled "DISK DRIVE HAVING DATA-GUARDING FIRMWARE." At step 86, the control system 12 of FIG. 1 sets a register to indicate whether a data error falls into an ECC category, a DSM category, or an IDNF category. The ECC category is a general category corresponding to an addressable location that was unrecoverable using the data detection and error correction circuitry 8 of FIG. 1. The DSM category corresponds to an addressable location that was unrecoverable due to failing to detect a Data Sync Mark (DSM) for symbol synchronizing the data stored in the addressable location. The IDNF category corresponds to an addressable location unrecoverable due to "ID Not Found." In the context of a headerless-format drive, IDNF corresponds to an addressable location that was unrecoverable because of an LBA issue. (In this regard, see U. S. Pat. No. 5,640,286 issued Jun. 17, 1997, titled "DISK DRIVE WITH ERROR CODE EMBEDDED SECTOR IDENTIFICATION.")

At a step 88, up to 4 Simple Re-reads are performed. If (and as soon as) one of these simple re-reads proves successful, the data stored in the addressable location is transferred to the host 36 without executing any of the data-recovery procedures of FIG. 2. Otherwise, at a step 90 another Simple Re-read is performed. If this simple re-read proves unsuccessful, a flag is set to indicate whether a thermal asperity ("TA") has been detected. At a step 92, a test is effected to determine whether the TA flag has been set. If not, the flow proceeds to step 94A and from there to the data-recovery procedure 96 labeled "DSM Extended Error Recovery Procedure" or to the data-recovery procedure 98 labeled "ECC Extended Error Recovery Procedure". If the TA flag has been set at step 92, the flow proceeds to step 94B and from there to the data-recovery procedure 100 labeled "TA ECC Retry Recovery Procedure" or to the data-recovery procedure 102 labeled "TA DSM Retry Recovery Procedure". At step 94A, a test is effected to determine whether to perform the DSM extended error recovery procedure 96 or to perform the ECC extended error recovery procedure 98.

As for the DSM recovery procedures, this can be a very extensive process involving many retries. The maximum number of retries suitably provided is set forth next to each functional block in FIG. 2. With respect to a first set of retries, each of these involves setting the threshold for detecting the DSM to a predetermined one of a set of thresholds. In this regard, see U.S. patent application Ser. No. 08/815,352, filed Mar. 11, 1997, titled "DISK DRIVE EMPLOYING READ ERROR TOLERANT SYNC MARK DETECTION" (the "Cloke application"), the disclosure of which is hereby incorporated by reference herein.

With respect to a single frame sync mark recovery procedure, this involves selecting a different one of two data sync marks (see the Cloke application). Another set of retries involves varying the parameters involved in the read channel (see the Cloke application). Up to 20 retries are involved using one set of read-channel parameters and up to 20 more are involved for a second such set. As for MRI, this is an acronym for MagnetoResistive head Instability. MRI involves the head entering an undesirable state. A recovery procedure that is the invention of another employee of the assignee is suitably invoked to attempt to first reset the head to its normal state, and then effecting another set of retries using the varying parameters for the read channel.

With respect to the data-recovery procedure 98 corresponding to the ECC extended error recovery procedure, this is generally similar to the data-recovery procedure 96; however, it starts with a set of up to 90 retries involving changes to the Finite Impulse Response (FIR) filter in the read channel.

The TA ECC and TA DSM retry recovery procedures 100 and 102 are similar to the data-recovery procedures 96 and 98; however, they can further involve "seek away" recovery and "burnish" recovery. Seek away involves an effort to move away from the target track and then seek back and then retry in an effort to dislodge a particle or the like that may be the source of the TA. Burnish involves multiple moves in the manner of a "shoe shine."

The correlation between the data-recovery procedure and the corresponding error in the disk drive 1 is determined empirically during manufacturing. For example, known errors can be introduced into the disk drive 1 (media errors, write errors, circuitry errors, etc.) and the data-recovery procedure which successfully overcomes each error recorded. An optimal set of weights can then be determined for a particular application based on the correlation between the error type and the successful data-recovery procedure. One particular application where weighting the data recover procedures provides an advantage over the prior all is drive failure prediction which is described in detail in the following section.

Drive Failure Prediction

Figure 3:
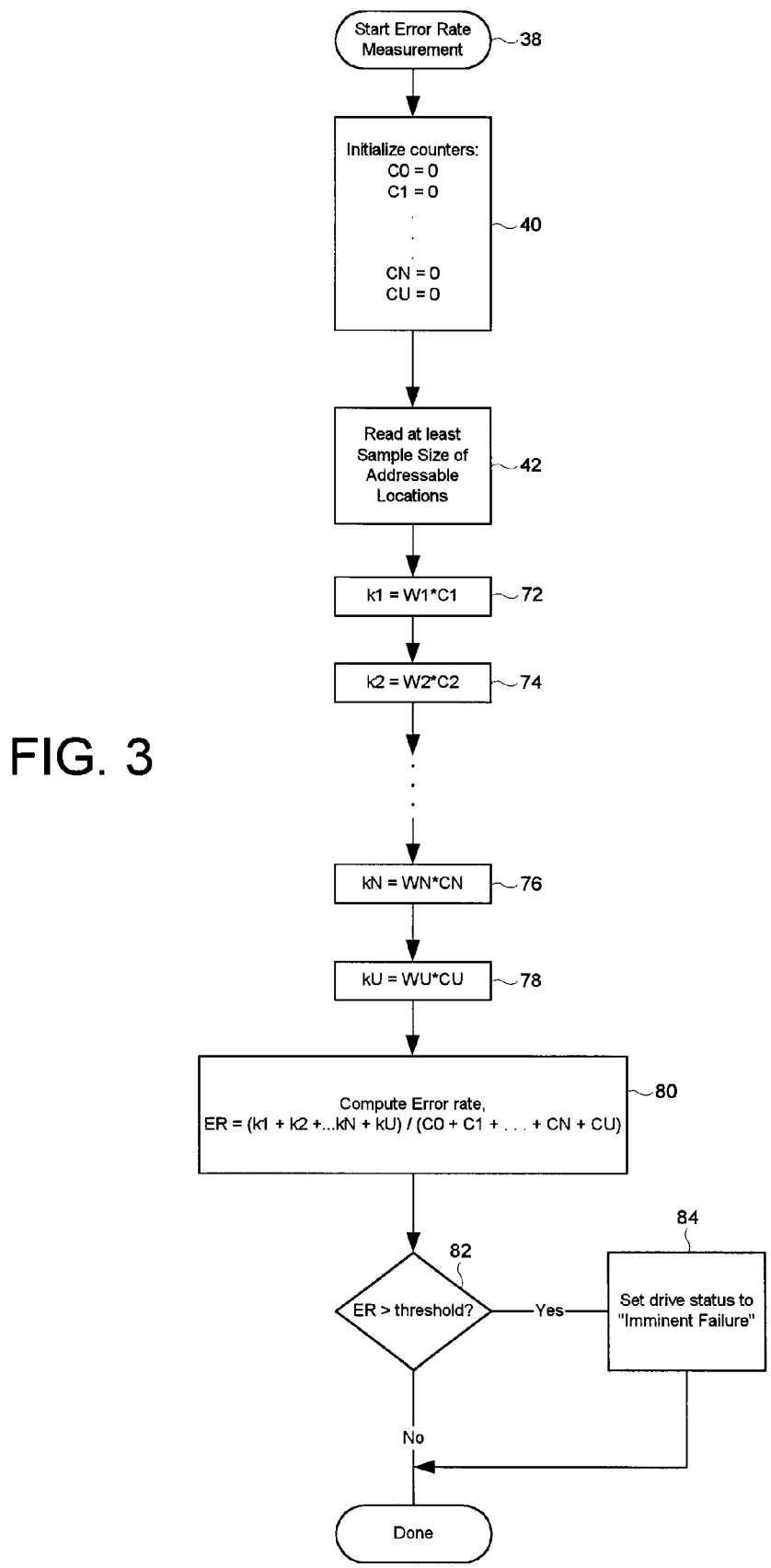
FIG. 3 is a flow diagram illustrating how the weighted data-recovery procedures can be used to more accurately predict drive failure.

FIG. 3 shows a flow chart of the steps executed by the control system 12 of FIG. 1 for implementing a drive failure prediction algorithm based on measuring an error rate according to one embodiment of the present invention. The error rate measurement begins at step 38. At step 40 a number of counters C0,C2 . . . CN and CU are initialized to zero. Counter C0 tracks the number of addressable locations that are successfully recovered during an initial read operation, and counters C1,C2 . . . CN track the number of times a particular data-recovery procedure was successful in recovering an addressable location when the initial read operation failed. Counter CU tracks the number of addressable locations that are permanently unrecoverable; that is, the number of addressable locations unrecoverable after attempting all of the data-recovery procedures.

Figure 4:
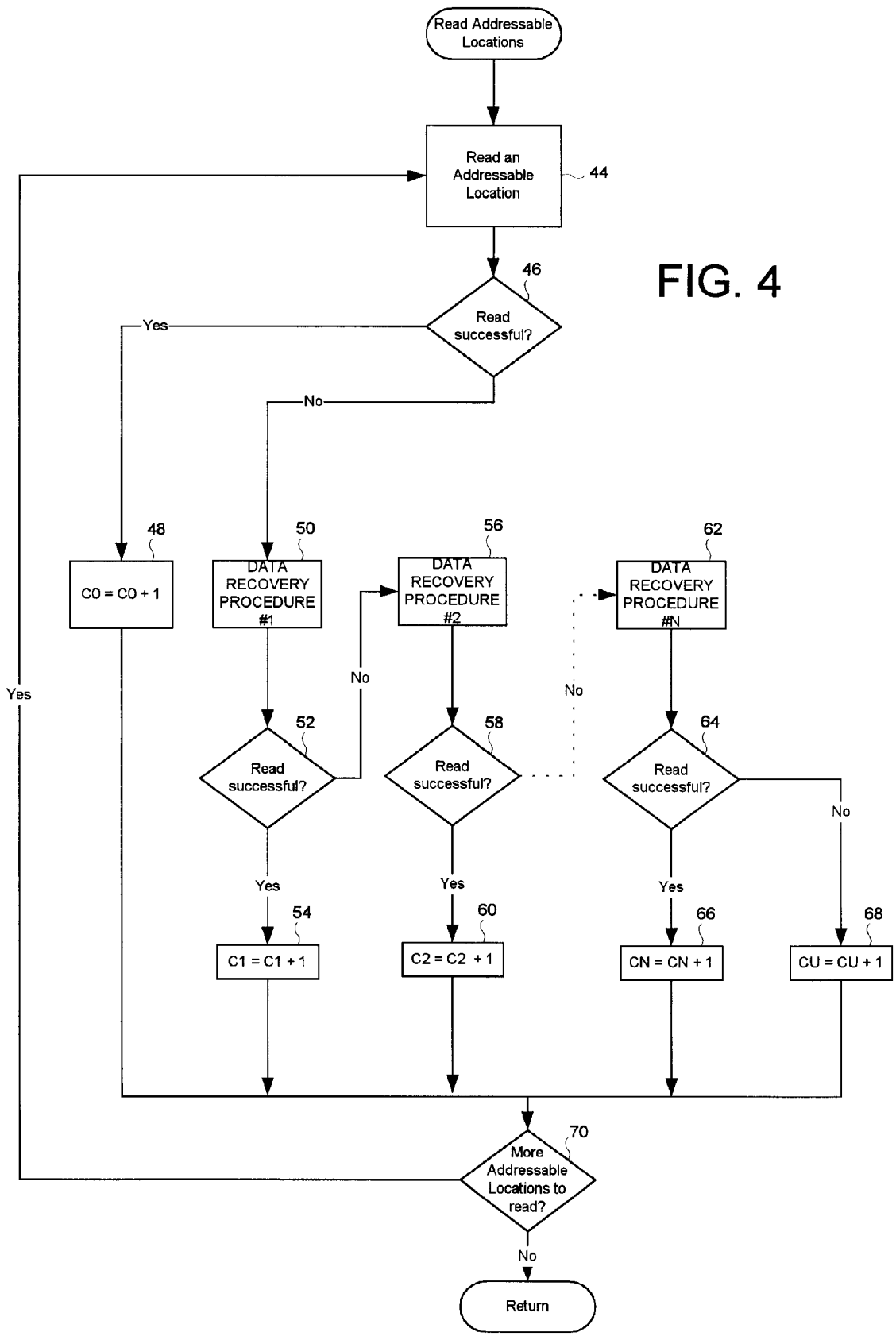
FIG. 4 is a more detailed flow diagram illustrating the data-recovery procedures that are executed when an addressable location is unrecoverable during an initial read operation.

At step 42, a number of addressable locations are read in order to develop an error rate measurement. The steps executed when reading the addressable locations are set out in FIG. 4. At step 44 an addressable location is read via the head 4, preamp 6 and read channel 8 of FIG. 1. At step 46, a branch is executed based on whether the addressable location was successfully recovered during the initial read, that is, whether the addressable location was successfully recovered using the sequence detector and ECC circuitry within the read channel 8. If the read was successful, then counter C0 is incremented at step 48. If the read was not successful, then at step 50 a first data-recovery procedure is executed wherein a parameter of the disk drive 1 is modified and a retry executed. At step 52 a branch is executed based on whether the retry read of the first data-recovery procedure 50 was successful. If the retry read of the first data-recovery procedure 50 was successful, counter C1 is incremented at step 54; otherwise, a second data-recovery procedure is executed at step 56 wherein a different parameter of the disk drive 1 is modified and another retry read executed. At step 58 a branch is executed based on whether the retry read of the second data-recovery procedure 56 was successful. If the retry read of the second data-recovery procedure 56 was successful, counter C2 is incremented at step 60; otherwise, a next data-recovery procedure is executed. This process continues until an Nth data-recovery procedure is executed at step 62. If the retry read of the Nth data-recovery procedure is successful at step 64, then at step 66 the counter CN is incremented; otherwise, counter CU is incremented to indicate that the addressable location is permanently unrecoverable. If at step 70 there are more addressable locations to read, then the flow chair of FIG. 4 is reiterated starting at step 44; otherwise, control returns to FIG. 3.

At step 72 of FIG. 3, the counter C1 (which represents the number of times the first data-recover procedure was successful) is multiplied by a weight value W1 to generate a weighted value k1. Similarly, at step 74 counter C2 (which represents the number of times the second data-recover procedure was successful) is multiplied by a weight value W2 to generate a weighted value k2. A similar weighting is applied to the remaining counters such that at step 76 the counter CN (which represents the number of times the Nth data-recover procedure was successful) is multiplied by a weight value WN to generate a weighted value kN, and at step 78 counter CU (which represents the number of times a data sector was unrecoverable) is multiplied by a weight value WU to generate a weighted value kU. Weighting the counters C1 . . . CN effectively weights the data-recovery procedures 1 . . . N based on the type of error that necessitated each data-recovery procedure.

At step 80, an error rate (ER) is computed according to the following equation:

$$ER = (k1+k2+\ldots+kN+kU)/(C0+C1+\ldots+CN+CU).$$

The above equation represents the ratio between the number of times the weighted data-recovery procedures were successful in recovering an addressable location over the total number of attempts to recover addressable locations. The contribution of each data-recovery procedure 1 . . . N to the error rate measurement depends on the weight values W1 . . . WN. When drive failure prediction is based on evaluating the signal processing circuitry, the data-recovery procedures that correlate highly with media errors are assigned a low weight value (e.g., 0) to attenuate, or even exclude, their contribution to the error rate measurement. Conversely, when drive failure prediction is based on evaluating the media, the data-recovery procedures that correlate highly with errors in the signal processing circuitry are assigned a low weight value (e.g., 0). Further, certain signal processing components may degrade faster than others; for example, the head 4 may degrade precipitously once an error occurs. Thus, a high weight value (e.g., 10) might be assigned to the data-recovery procedure(s) which correlate highly with the head 4 to ensure that an imminent drive failure is detected in time for remedial action.

At step 82, the error rate measurement ER is compared to a predetermined threshold. If it exceeds the threshold, then at step 84 a drive status is set to "imminent failure". The drive status is ultimately communicated to the host 36 so that the end user may take the appropriate remedial steps to avoid losing data, such as backing up the disk drive 1.

We claim:

1. A disk drive comprising:
   (a) a disk including a plurality of addressable locations containing stored data;
   (b) signal processing circuitry comprising:
      reading means responsive to the stored data for producing a read signal; and
      means responsive to the read signal for producing decoded data that is subject to errors;
   (c) a control system, responsive to the decoded data, for computing an error rate measurement by:
      performing a first data-recovery procedure conducted under conditions providing for increasing the probability of achieving a first successful data-recovery step;
      performing a second data-recovery procedure conducted under conditions providing for increasing the probability of achieving a second successful data-recovery step;
      generating a first accumulated value representing occurrences of the first successful data recovery step;
      generating a second accumulated value representing occurrences of the second successful data recovery step;
      weighting the first accumulated value by a first weight to generate a first weighted value;
      weighting the second accumulated value by a second weight different than the first weight to generate a second weighted value; and
      computing the error rate measurement by combining the first and second accumulated values and the first and second weighted values.

2. The disk dive as recited in claim 1, wherein:
   the conditions for increasing the probability of achieving a first successful data recovery step are correlated with a first type of error; and
   the conditions for increasing the probability of achieving a second successful data recovery step are correlated with a second type of error.

3. The disk drive as recited in claim 2, wherein:
   the first type of error has a high correlation with performance of the signal processing circuitry and a low correlation with an identifiable subset of the plurality of addressable locations; and
   the second type of error has a high correlation with an identifiable subset of the plurality of addressable locations and a low correlation with performance of the signal processing circuitry.

4. The disk drive as recited in claim 3, wherein the second weight is zero thereby excluding the second type of error from the error rate measurement.

5. The disk drive as recited in claim 4, wherein the error rate measurement corresponds to a probability that the disk drive will fail.

6. The disk drive as recited in claim 2, wherein the first and second weights are selected to bias the error rate measurement based on the type of error correlated with the first and second successful data-recovery steps, respectively.

7. The disk drive as recited in claim 6, wherein the error rate measurement corresponds to a probability that the disk drive will fail.

8. A method of computing an error rate measurement in a disk drive comprising a disk including a plurality of addressable locations containing stored data and signal processing circuitry comprising reading means responsive to the stored data for producing a read signal and means responsive to the read signal for producing decoded data that is subject to errors, the method comprising the steps of:
   (a) performing a first data-recovery procedure on the decoded data conducted under conditions providing for increasing the probability of achieving a first successful data recovery step;
   (b) performing a second data-recovery procedure on the decoded data conducted under conditions providing for increasing the probability of achieving a second successful data recovery step;
   (c) generating a first accumulated value representing occurrences of the first successful data recovery step;
   (d) generating a second accumulated value representing occurrences of the second successful data recovery step;
   (e) weighting the first accumulated value by a first weight to generate a first weighted value;
   (f) weighting the second accumulated value by a second weight different than the first weight to generate a second weighted value; and (g) computing an error rate measurement by combining the first and second accumulated values and the first and second weighted values.

9. The method of computing an error rate measurement as recited in claim 8, wherein:
   the conditions for increasing the probability of achieving a first successful data recovery step are correlated with a first type of error; and
   the conditions for increasing the probability of achieving a second successful data recovery step are correlated with a second type of error.

10. The method of computing an error rate measurement as recited in claim 9, wherein:
    the first type of error has a high correlation with performance of the signal processing circuitry and a low correlation with an identifiable subset of the plurality of addressable locations; and
    the second type of error has a high correlation with an identifiable subset of the plurality of addressable locations and a low correlation with performance of the signal processing circuitry.

11. The method of computing an error rate measurement as recited in claim 10, wherein the second weight is zero thereby excluding the second type of error from the error rate measurement.

12. The method of computing an error rate measurement as recited in claim 11, wherein the error rate measurement corresponds to a probability that the disk drive will fail.

13. The method of computing an error rate measurement as recited in claim 9, wherein the first and second weights are selected to bias the error rate measurement based on the type of error correlated with the first and second successful data-recovery steps, respectively.

14. The method of computing an error rate measurement as recited in claim 13, wherein the error rate measurement corresponds to a probability that the disk drive will fail.

15. A disk drive comprising:
   (a) a disk including a plurality of addressable locations containing stored data;
   (b) signal processing circuitry comprising:
      reading means responsive to the stored data for producing a read signal; and
      means responsive to the read signal for producing decoded data that is subject to errors;
   (c) a control system, responsive to the decoded data, for:
      performing a first data-recovery procedure conducted under conditions providing for increasing the probability of achieving a first successful data-recovery step;
      performing a second data-recovery procedure conducted under conditions providing for increasing the probability of achieving a second successful data-recovery step;
      generating a first accumulated value representing occurrences of the first successful data recovery step;
      generating a second accumulated value representing occurrences of the second successful data recovery step;
      weighting the first accumulated value by a first weight to generate a first weighted value; and
      weighting the second accumulated value by a second weight different than the first weight to generate a second weighted value.

16. The disk drive as recited in claim 15, wherein the control system computes an error rate measurement by combining the first and second accumulated values and the first and second weighted values.

17. A method of operating a disk drive comprising a disk including a plurality of addressable locations containing stored data and signal processing circuitry comprising reading means responsive to the stored data for producing a read signal and means responsive to the read signal for producing decoded data that is subject to errors, the method comprising the steps of:
   (a) performing a first data-recovery procedure on the decoded data conducted under conditions providing for increasing the probability of achieving a first successful data recovery step;
   (b) performing a second data-recovery procedure on the decoded data conducted under conditions providing for increasing the probability of achieving a second successful data recovery step;
   (c) generating a first accumulated value representing occurrences of the first successful data recovery step;
   (d) generating a second accumulated value representing occurrences of the second successful data recovery step;
   (e) weighting the first accumulated value by a first weight to generate a first weighted value; and
   (f) weighting the second accumulated value by a second weight different than the first weight to generate a second weighted value.

18. The method as recited in claim 17, further comprising the step of computing an error rate measurement by combining the first and second accumulated values and the first and second weighted values.

* * * * *